H. T. GOSS & J. W. BRYCE.
COMPUTING MACHINE.
APPLICATION FILED OCT. 4, 1913.
1,284,188.
Patented Nov. 5, 1918.
11 SHEETS—SHEET 1.
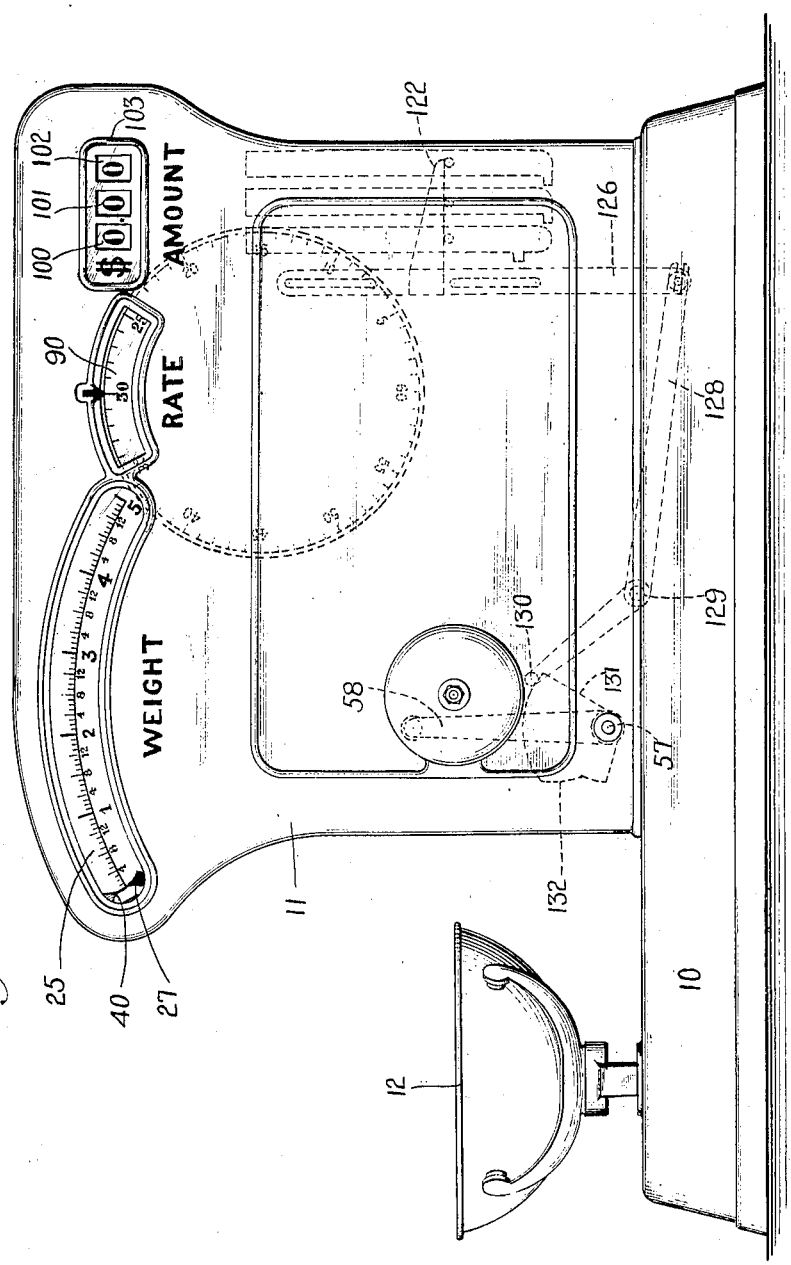

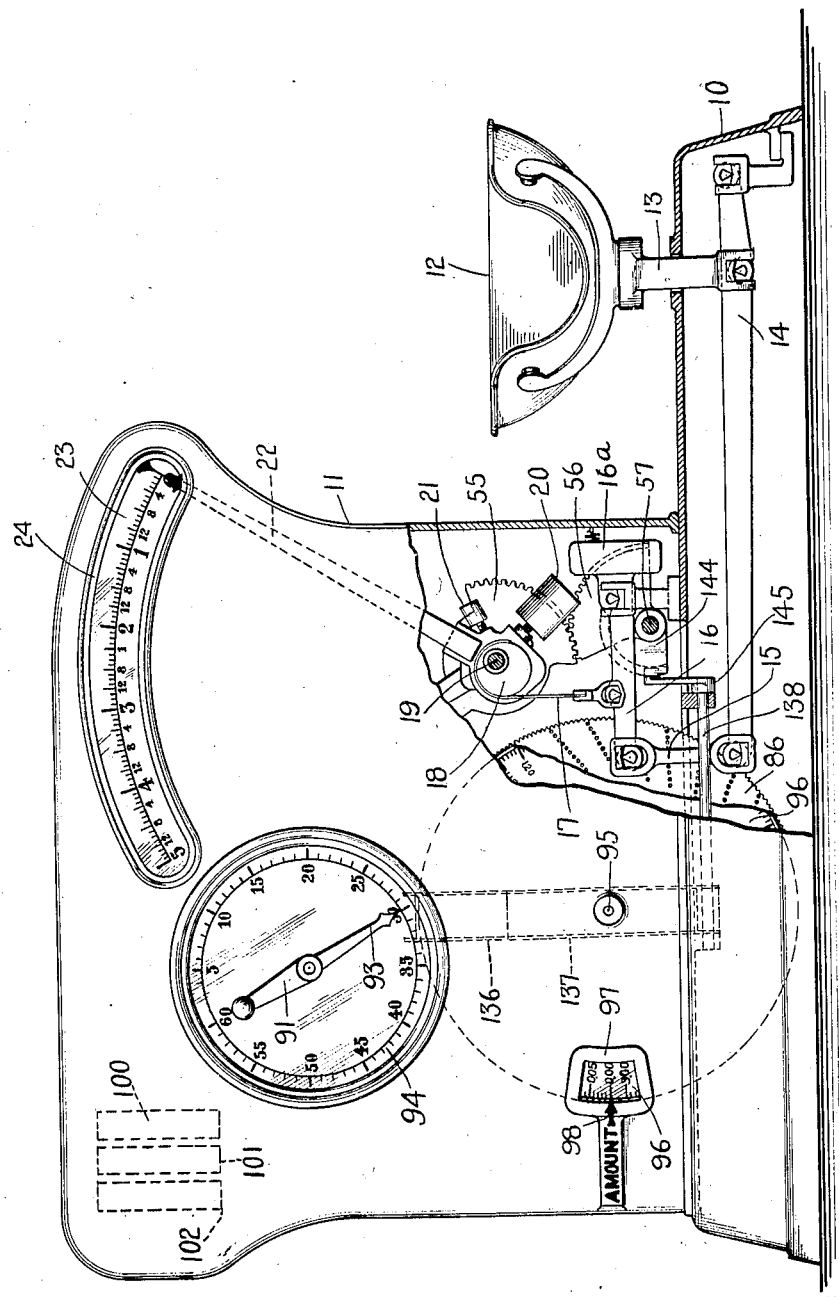

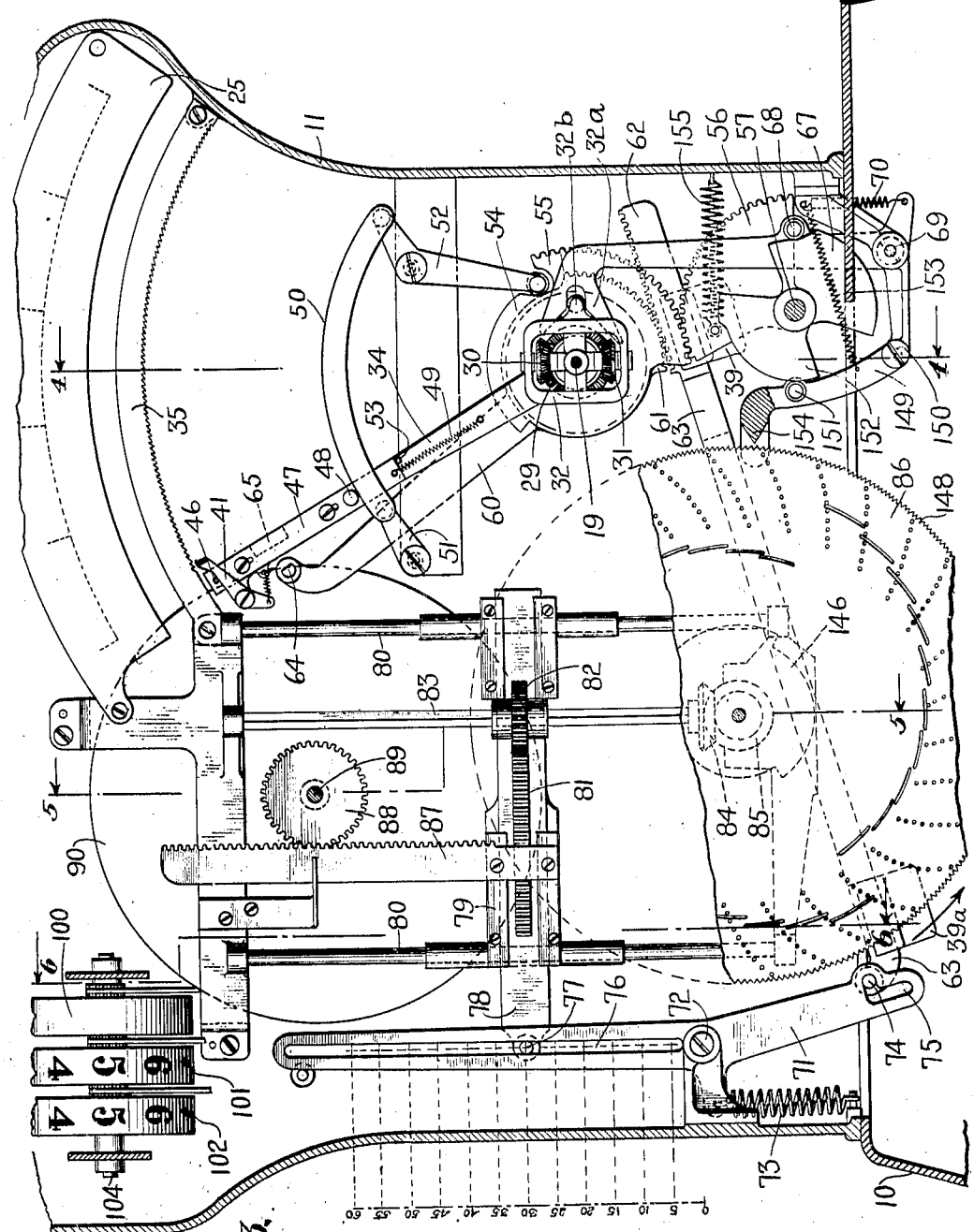

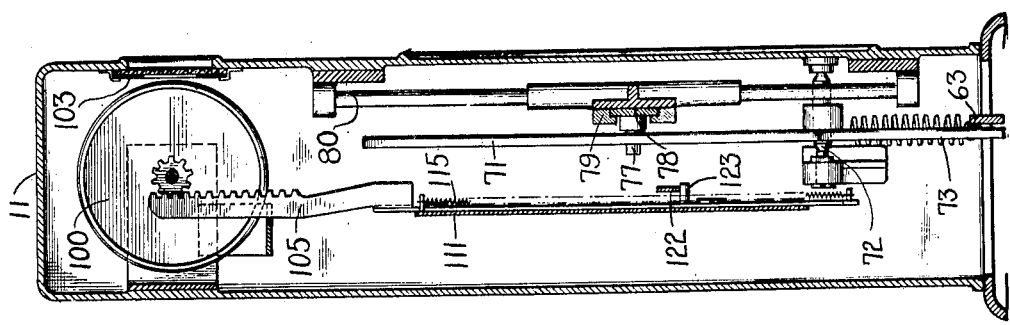
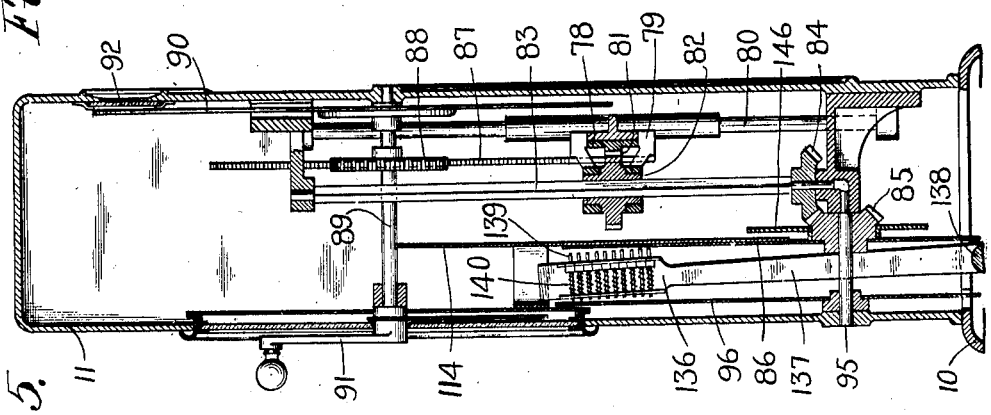
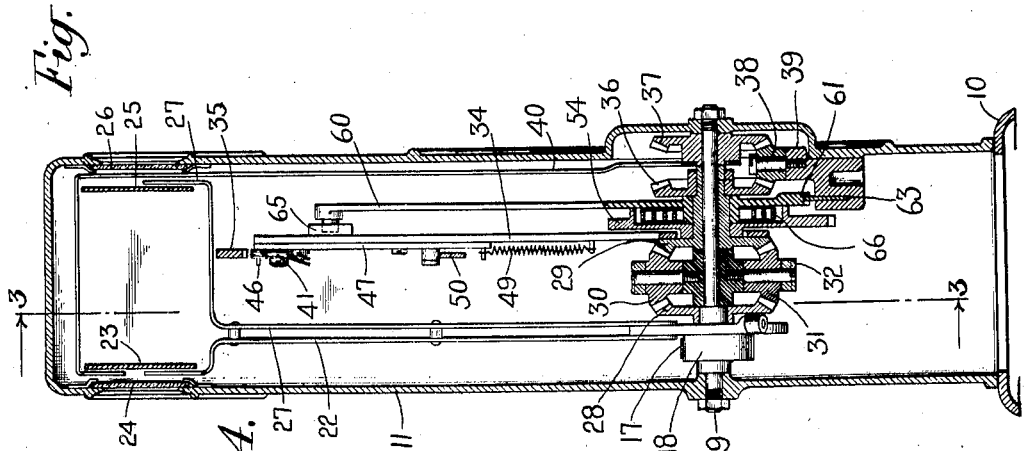

H. T. GOSS & J. W. BRYCE.
COMPUTING MACHINE.
APPLICATION FILED OCT. 4, 1913.
1,284,188.
Patented Nov. 5, 1918.
11 SHEETS—SHEET 5.
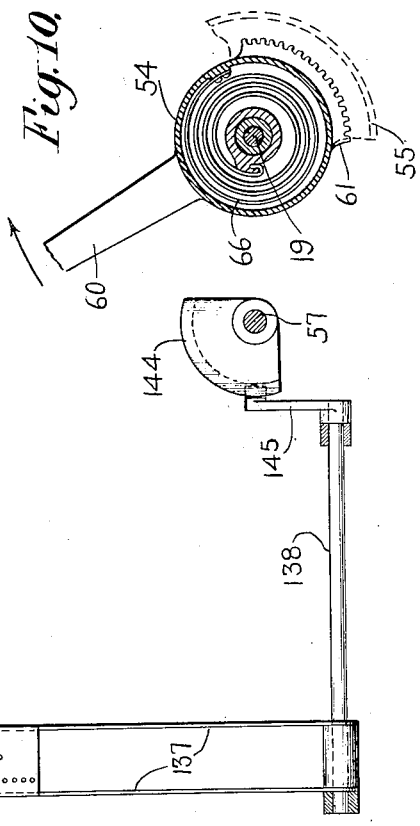
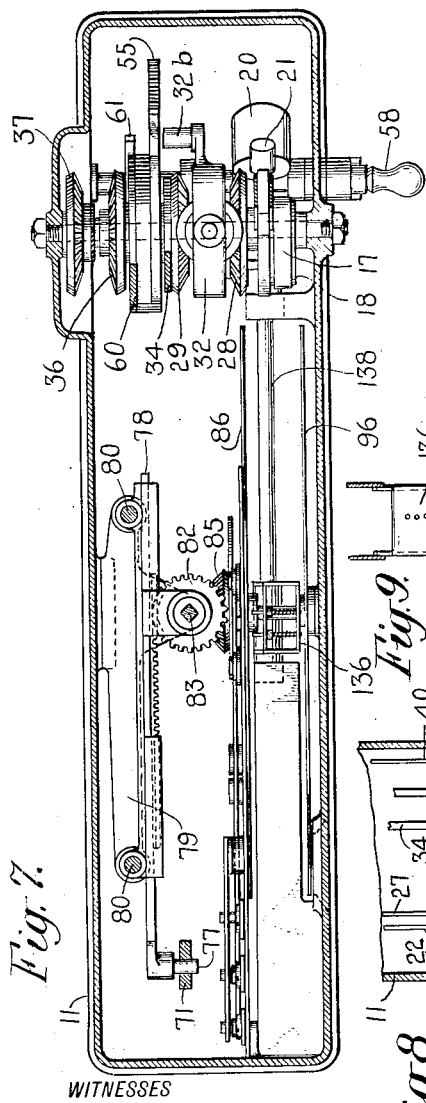
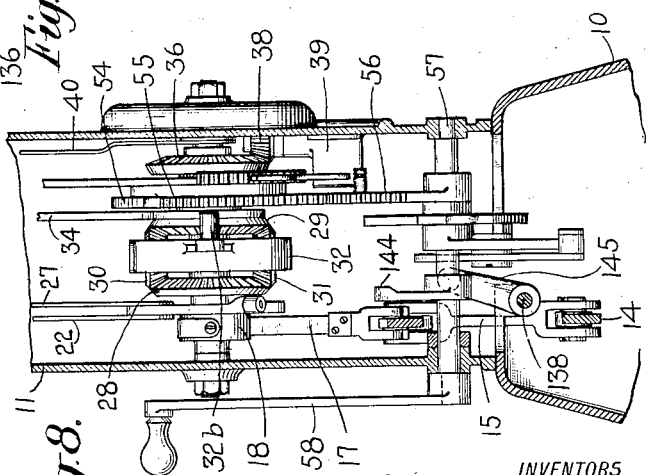

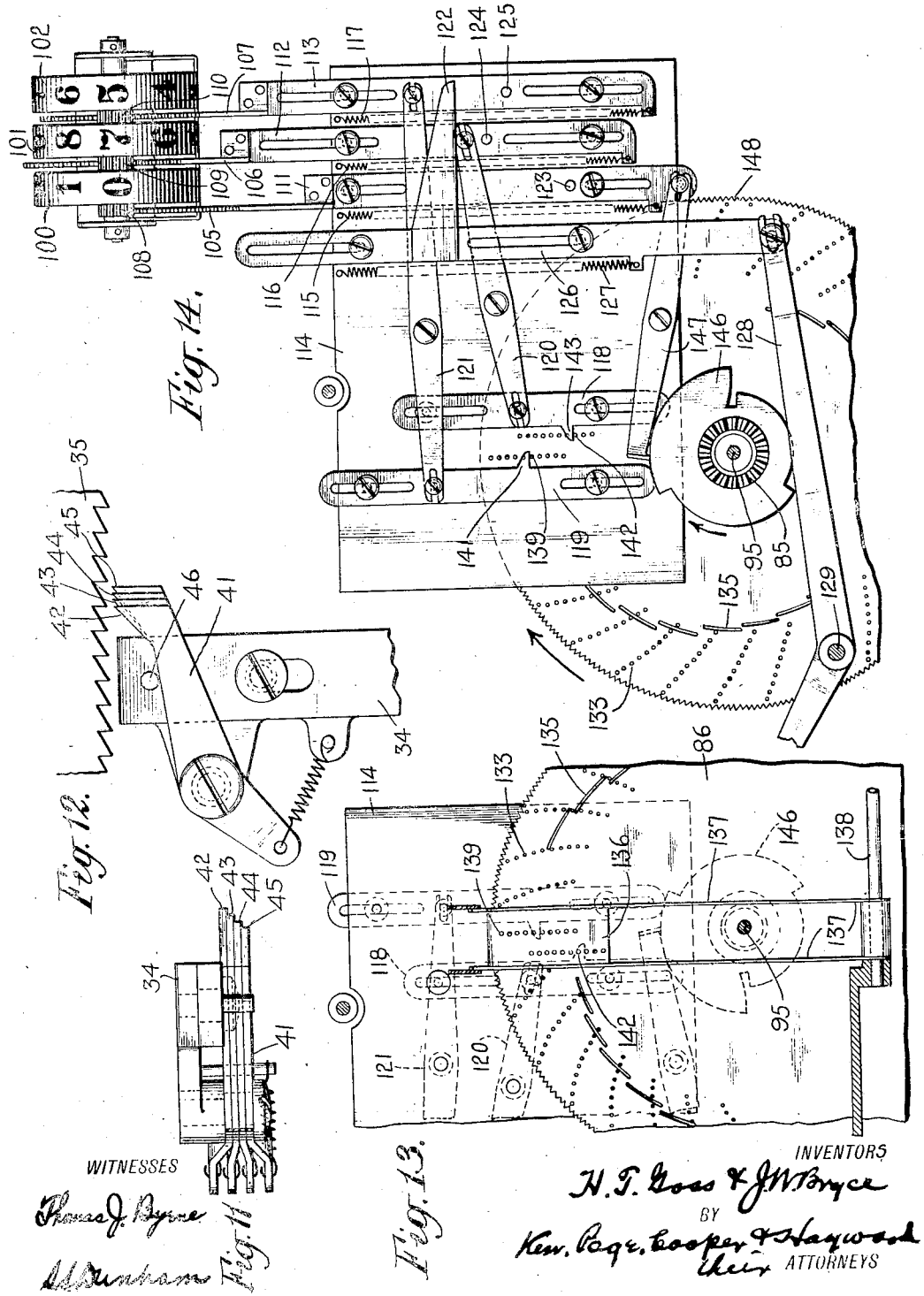

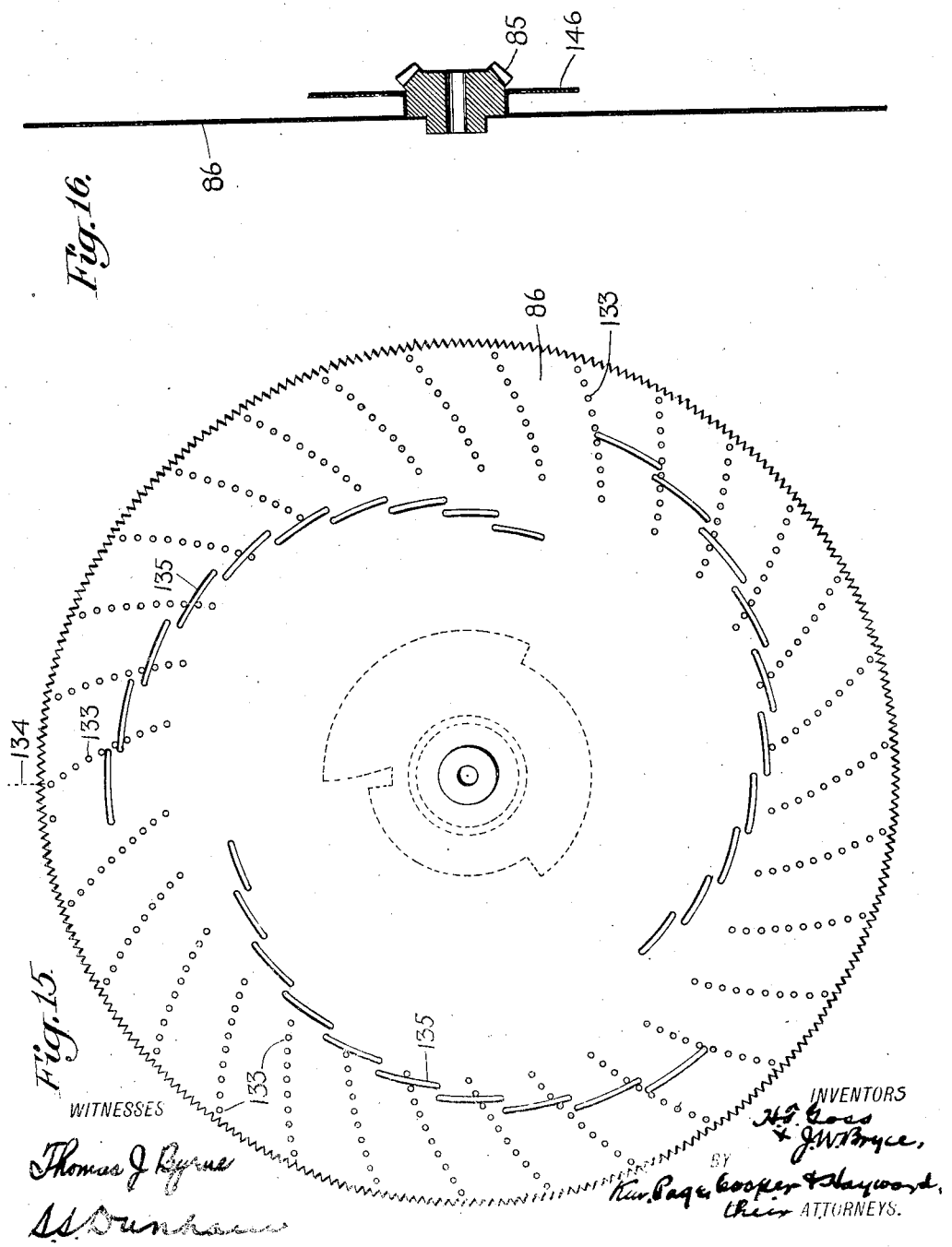

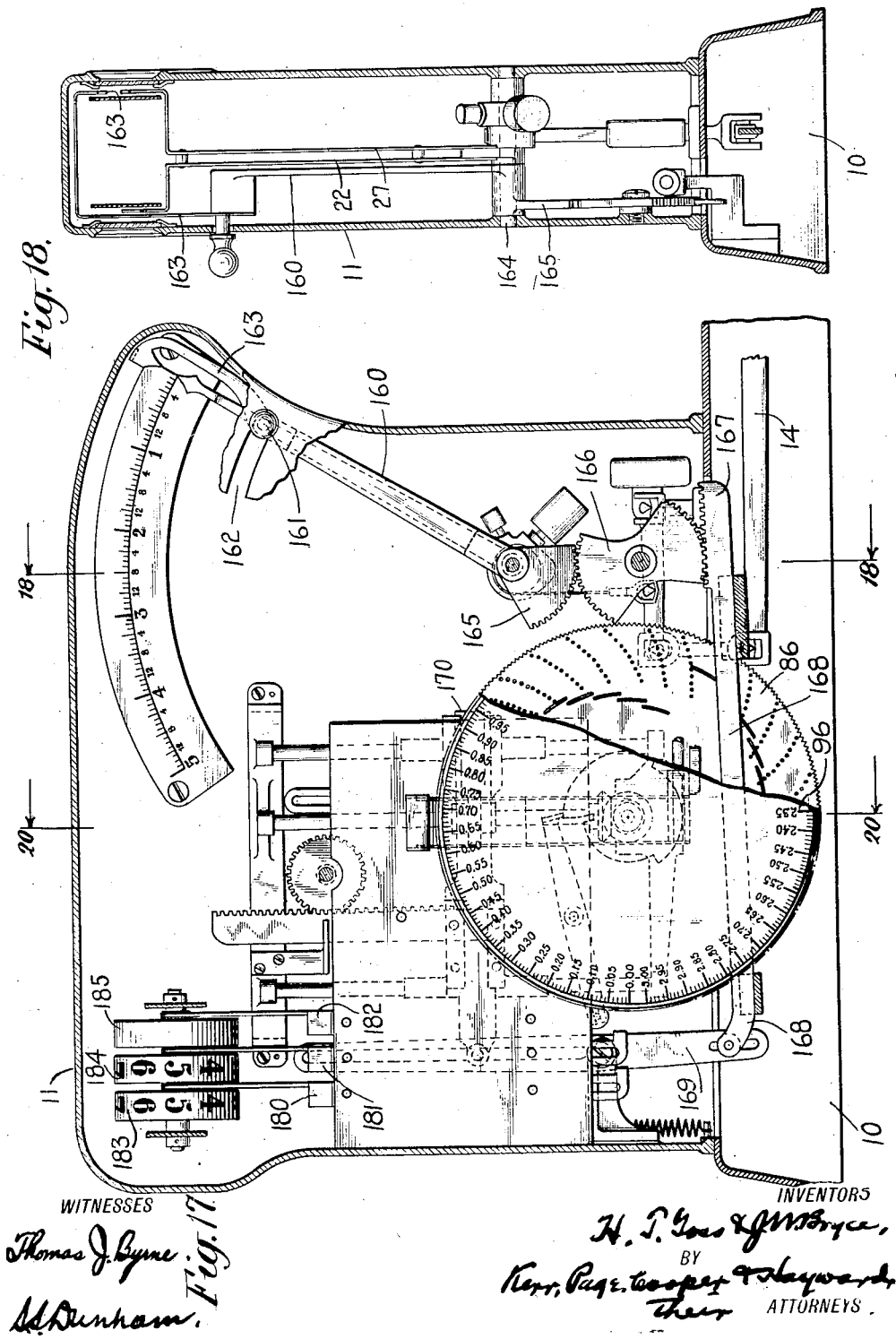

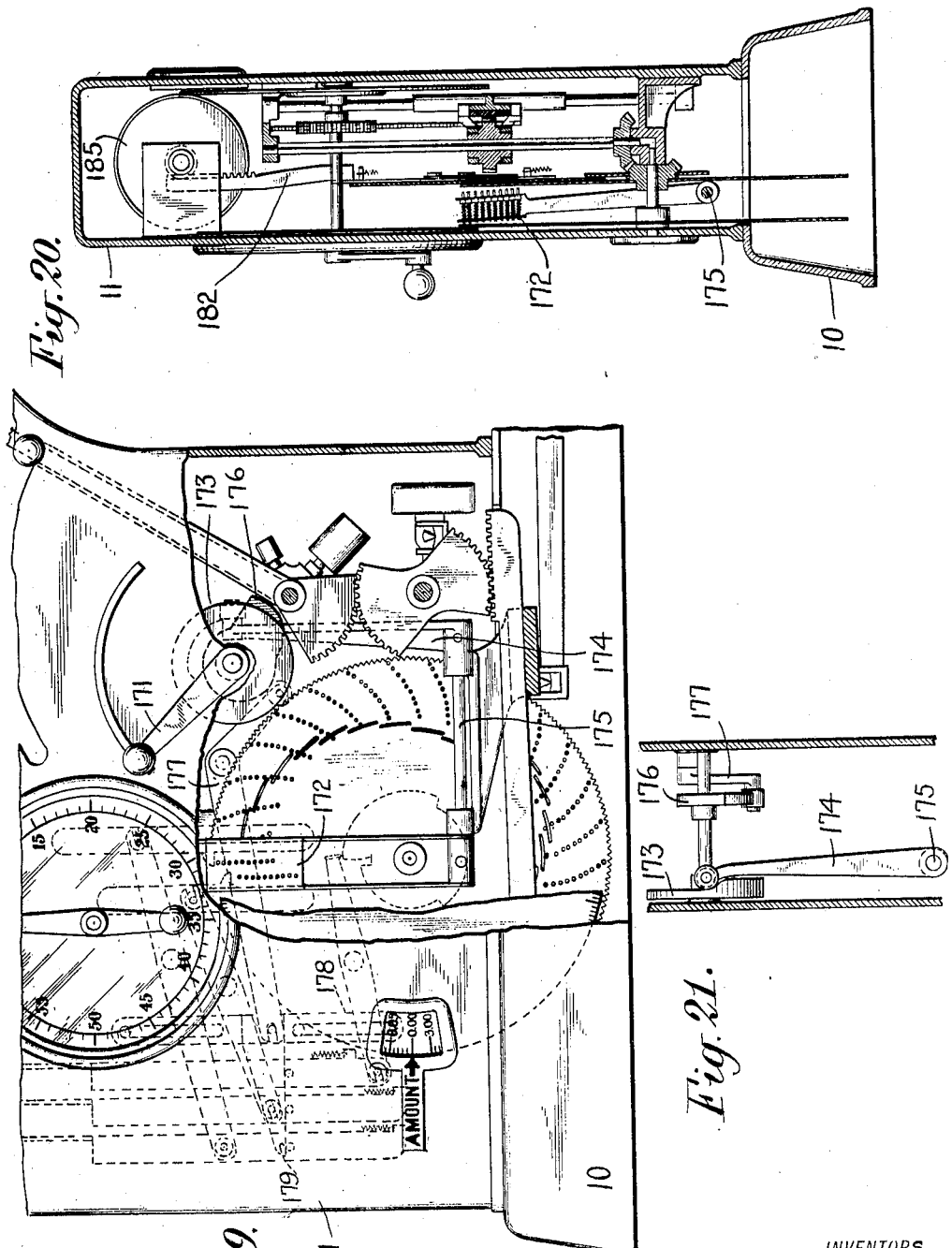

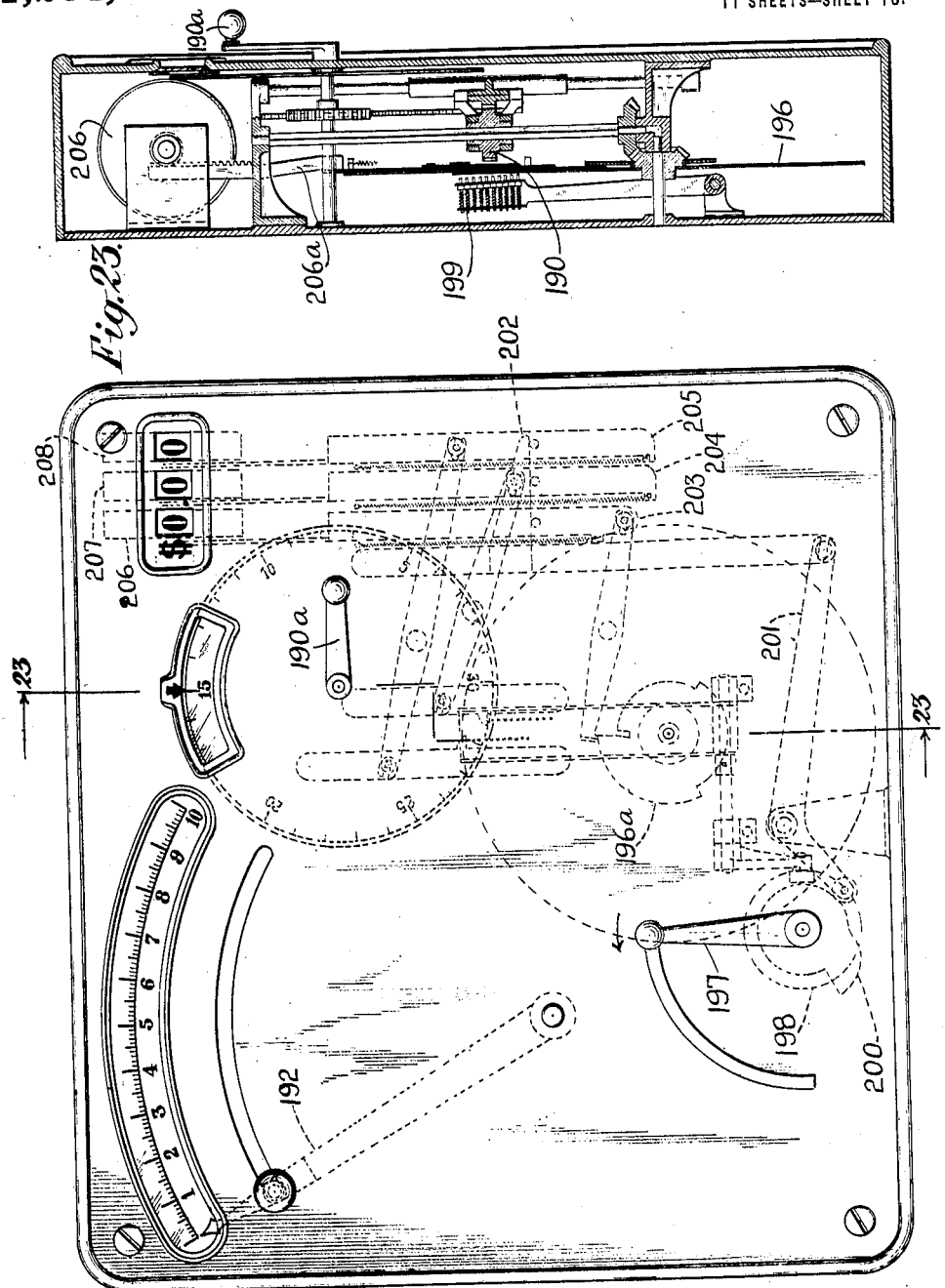

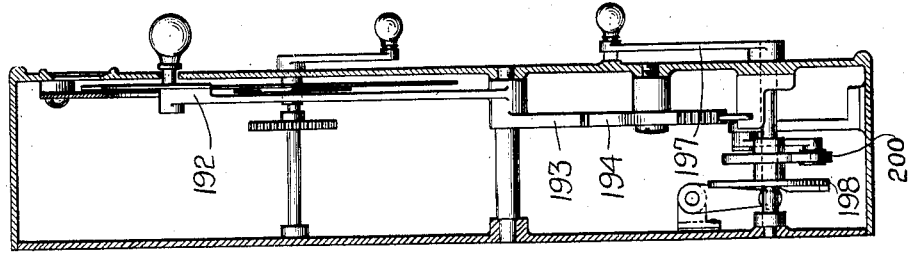
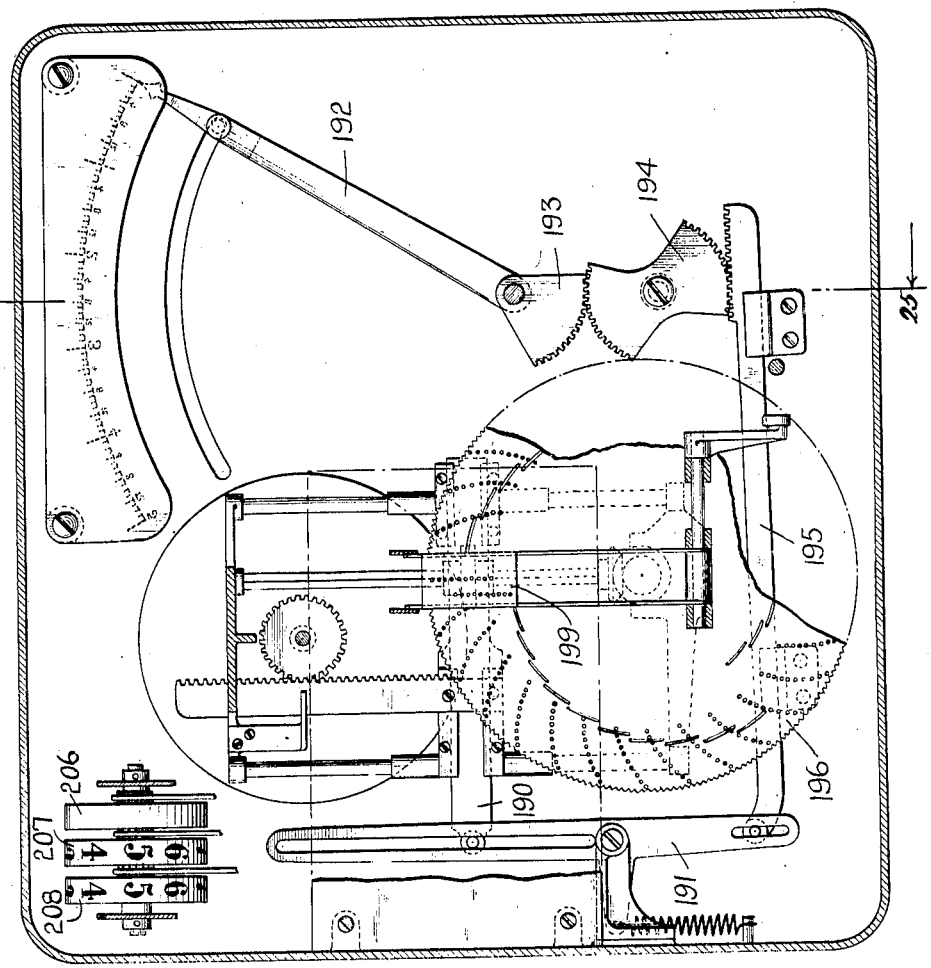

UNITED STATES PATENT OFFICE.

HARRY T. GOSS, OF RUTHERFORD, AND JAMES W. BRYCE, OF BLOOMFIELD, NEW JERSEY, ASSIGNORS TO INTERNATIONAL TIME RECORDING COMPANY OF NEW YORK, OF ENDICOTT, NEW YORK, A CORPORATION OF NEW YORK.

COMPUTING-MACHINE.

1,284,188.  Specification of Letters Patent.  Patented Nov. 5, 1918.

Application filed October 4, 1913. Serial No. 793,283.

*To all whom it may concern:*

Be it known that we, HARRY T. GOSS and JAMES W. BRYCE, both citizens of the United States, residing, respectively, at Rutherford, county of Bergen, and at Bloomfield, county of Essex, in the State of New Jersey, have invented certain new and useful Improvements in Computing-Machines, of which the following is a full, clear, and exact description.

This invention relates to calculating machines by which numbers or "items" are added, subtracted, multiplied, or divided. More particularly the invention in its present form relates to machines for multiplying factors at least one of which is variable, and its chief object is to provide for the purpose an improved apparatus of simple construction and operation. A further object is to provide a machine, particularly in connection with a scale for weighing goods, by which the product of the two factors—for example the weight of the goods and the price thereof per unit weight—will be displayed on numeral wheels or dials as an integral or mixed number and not merely on a graduated drum or dial as heretofore.

To these and other ends the invention in its preferred form is characterized by the employment of a movable or adjustable device which for convenience may be termed a controller or controlling element, for the reason that its chief function is to control or determine the operation of the numeral wheels so that they will present to view the correct product. This element may take various forms, as for example, a cone, or a cylinder, or a flat plate of polygonal or of circular contour, but in the preferred embodiment of the invention the element named is in the form of a circular disk, rotatively adjustable about its center. In general, the controlling element bears all the products, up to the maximum within the range of the machine; in particular it may bear only a part of each product, for example, the fractional part or the lower "order" or "orders," leaving the higher orders to be taken care of by an additional and analogous element. Thus in the preferred embodiment, designed to give the product in terms of dollars and cents (or, dollars and decimal fractions of a dollar) the controlling disk provides for the cents and a suitable cam takes care of the dollars in determining the operation of the numeral wheels. In any case, where the product is given by means of numeral wheels, the controlling element, whether conical, cylindrical, or plane, etc., bears the products or parts thereof in the form of perforations, or projections, or the like, suitably arranged in one or more "groups" or series. Thus in the case of a circular disk, there may be provided as many perforations or projections as there are units in the largest product provided for by the disk. For instance, if the disk is intended to take care of products up to 300, it would have three hundred unit-perforations or projections, arranged in thirty groups or series, each having ten of the perforations or projections. Similarly, the disk may have thirty tens-perforations or projections, in three groups or series of ten each, and also three hundred-perforations or projections. The perforations, apertures, projections, or whatever they may be, are so arranged on the controlling element that when the latter is moved or adjusted, in accordance with the factors to be multiplied, only one perforation or projection of each group or series will be presented in position for coöperation with the mechanism of the numeral wheels.

Within the spirit of our invention, various methods may be employed for controlling the movements of the numeral wheels through the medium of the perforations or projections on the so-called controlling element. For example, the wheels may be permitted to rotate until parts connected to, and moving with, the wheels are arrested by the particular perforations or projections presented for coöperation with such parts. Preferably, however, we provide what is herein conveniently termed a "pin-box", comprising a frame having one or more rows of spring pins. When this device is moved toward the controlling element, one pin of each row finds a perforation in its path, which permits such pin to pass through the controlling element and into the path of a part which is connected to, and moves with, the particular numeral wheel associated with that row of pins; or finds in its path a projection which holds the pin in the path of the aforesaid part, while the other pins of the row pass on and out of such path.

In the preferred form of the invention, the operative movement of the controlling element is in one direction only, and the extent of its movement corresponds, in general, to the numerical value of the product of the factors to be multiplied.

In lieu of, or in addition to, the perforations, projections, or other agencies referred to, the controlling element may have the various products marked upon it, by engraving, printing, or otherwise, so that the product may be read from the controlling element itself as well as from the numeral wheels, if such are provided.

Our invention also contemplates the use of printing devices, for instance numeral-wheels provided with types; by which the result or product of the computation may be printed upon a suitable receiving surface, for example, a tape or card, but to avoid complicating the present application, such devices are not described herein. Inasmuch as multiplication is, fundamentally, only repeated addition, and subtraction and division are the reverse of addition and multiplication, respectively, the principles of our invention can be used for performing any of the four fundamental operations of arithmetic. We have, however, deemed it sufficient to describe, in the present application, only machines for multiplying two factors.

Several convenient and effective forms of the invention are illustrated in the accompanying drawings, in which:

Figure 1 is a front view of the complete apparatus.

Fig. 2 is a rear view of the apparatus, but with a portion of the housing broken away to show certain interior parts.

Fig. 3 is a vertical section substantially on line 3—3 of Fig. 4.

Figs. 4, 5 and 6 are vertical sections substantially on lines 4—4, 5—5 and 6—6 of Fig. 3.

Fig. 7 is a horizontal section, about on line 7—7 of Fig. 3.

Fig. 8 is a detail view, partly in section, of the mechanism actuated or controlled by the scale pan.

Fig. 9 is a detached view of the "pin-box" and its actuating cam.

Fig. 10 is a detail sectional view of the yielding connection between the arm, which is controlled by the weight of the material in the scale pan, and the manual operating mechanism.

Figs. 11 and 12 are detail plan and side views, respectively, of the pawl which locks the controlling arm after the latter is moved by the scale pan.

Fig. 13 is a detail view of the pin-box and the controlling element (in the present instance a disk of sheet metal) by which the movements of the numeral wheels are controlled.

Fig. 14 is a detail view of the numeral-wheel-actuating mechanism and the devices which, in coöperation with the controlling element and pin box, control the numeral-wheels.

Fig. 15 is a front view of the controlling disk, and Fig. 16 is a central vertical section of the same.

Fig. 17 is a rear view of another embodiment of the invention, with a casing in section. In this embodiment the operation is almost wholly manual.

Fig. 18 is a vertical section substantially on line 18—18 of Fig. 17.

Fig. 19 is a front view of the embodiment shown in Fig. 17, with part of the casing broken away to show the controlling disk, the pin-box, and other elements.

Fig. 20 is a section on line 20—20 of Fig. 17.

Fig. 21 is a detail view of the pin-box actuating mechanism.

Fig. 22 is a front view of a still simpler embodiment, which may be used for "cost-keeping" and other purposes.

Fig. 23 is a vertical section substantially on line 23—23 of Fig. 22.

Fig. 24 is a rear view of the embodiment shown in Fig. 23, with the casing in vertical section.

Fig. 25 is a vertical section on line 25—25 of Fig. 24.

The operative parts of the machine are conveniently mounted in or upon a housing, consisting of a base 10 and an upright casing 11 at the front of the former. The scale pan 12, to receive the goods to be weighed, is mounted on a stem 13 (Fig. 2), pivotally supported by the scale beam 14, one end of which is connected by a link 15 to a supplementary beam or lever 16, counterweighted at 16ª, which is in turn connected to the depending end of a pliable strap or tape 17 wrapped on an eccentric 18 mounted on a shaft 19 and provided with suitable counterweights 20, 21. These counterweights are preferably adjustable toward and from the axis of shaft 19 to put the scale in "balance." Connected with the shaft is a pointer or index 22, traversing a graduated scale 23 upon which the weight may be read when the pointer comes to rest. This scale is visible from the rear through a suitable window 24; and at the front is a similar scale 25 (Figs. 4 and 5), seen through a window 26. A pointer 27, fixed to and movable in unison with the pointer 22 traverses the scale 25.

In general it is desirable, and in order to conform with the laws of some States and municipalities it is essential, that the scale shall at no time in the operation be locked but shall at all times be entirely free. At the same time, in the present embodiment of our invention the descent of the scale pan must take part in determining the extent of movement of the controller or controlling device (hereinafter described) to its final position. Various means may be employed to effect this function while leaving the scale free at all times, but we prefer the mechanism now to be described. The mechanism just referred to, shown in Figs. 3, 4, 7, 8 and 10, includes a differential device consisting of a bevel gear 28 co-axial with and fixed to the eccentric 18, a bevel gear 29 loose on the shaft 19, and two bevel pinions 30, 31, mounted on radial studs carried by a carrier 32 rotatable on the shaft 19. It is evident that if the carrier 32 is free to revolve, rotary movement of the gear 28 will have no effect on the gear 29. If, however, the carrier is held stationary, rotation of the gear 28 in one direction will turn the gear 29 in the opposite direction. Normally, the carrier is held by a fork 32$^a$ engaging a roller stud 32$^b$ on one side of said carrier, so that as the scale pan descends not only will the pointers 22, 27 be moved over their respective scales but also the arm 34, fixed to the gear 29, will be swung along the arc-shaped ratchet 35. When the scale pan and the pointers come to rest the arm 34 also comes to rest; whereupon, by means hereafter described, arm 34 is locked and the carrier 32 is simultaneously unlocked. The arm 34 is therefore held in the position to which it was brought by the goods on the pan, but the pan itself is free. Hence if the salesman should surreptitiously remove any part of the goods from the pan the pointer would instantly reveal the fact by swinging away from its former position. For the purpose of indicating the position of the arm 34 both to the salesman and to the customer, a second differential mechanism is provided, comprising a bevel gear 36 fixed on the hub of the gear 29, a bevel gear 37 loose on the shaft 19, and a bevel pinion 38, rotatable on a stud fixed in the bracket 39. Fixed to the gear 37 is a pointer 40 extending up past the scale 25 and over upon the scale 23. Since the pinion 38 cannot revolve around the shaft 19 it will be seen that the gear 37 and index 40 will move in unison with gear 29 and arm 34 and will come to rest and be locked with the latter although the scale pan and the pointers 22, 27, are free to move. As long as the two pointers 27 and 40 coincide the customer can be sure that the scale pan contains the weight indicated. If the two do not coincide he knows that something is wrong.

The arm 34 is locked upon the arc-shaped ratchet or rack 35, which is provided with any suitable number of teeth, say one tooth for each ounce. Thus in a machine with a capacity of five pounds the rack would have eighty teeth. On the end of the arm is a quadruple pawl 41 (Figs. 11 and 12) whose teeth 42, 43, 44, 45, are separated by spaces each equal to one-fourth the space between successive teeth on the rack 35, so that when, the arm 34 having come to rest, the pawl is permitted to swing up into engagement with the rack the arm will be locked to the rack at the position corresponding to the weight of material in the scale pan, within one-quarter ounce of the exact weight. That is, the maximum error in the position of the arm 34 is one-fourth of a tooth on the rack 35, which error corresponds to one-fourth of an ounce. Of course the limit of possible error depends upon the number of pawl-points provided in the space of one tooth on the rack, and may be made as large or as small as desired by decreasing or increasing the number of such pawl-points, or by varying the spacing of the rack-teeth and pawl-points, etc.

Normally the pawl 41 is held out of engagement with the rack 35 by a pin or stud 46 fixed to a slide 47 mounted on the arm 34. On the lower end of the slide is a stud 48. A spring 49 draws the slide downward, thereby depressing the pawl 41, and holds the stud 48 close to or against an arc-shaped link 50 pivoted at one end on a pivoted arm 51 and at the other end pivotally connected to a bell-crank lever 52. Assuming the lever 52 to be rocked counter-clockwise (as seen in Fig. 3) the link 50 will rise and so lift the slide 47, thereby releasing the pawl 41. To prevent the stud 48 bearing too hard upon the link 50, or to hold it normally out of contact with the link, the downward movement of the slide 47 through the agency of the spring 49 is limited by a stop 53 on the arm 34.

The movement of the lever 52, described in the foregoing paragraph, for the purpose of releasing the pawl 41 so that the same may lock the arm 34 in any position to which it may have been brought by the weight of material in the scale pan, is effected by a cam 54, loose on the hub of the bevel gear 29 and having a toothed portion or segmental gear 55 meshing with a like gear 56 on the shaft 57, actuated manually by a crank 58, Figs. 1, 7 and 8.

Having described how the arm 34 is locked in a position determined by the weight of the material in the pan we shall now explain one method by which this locked arm may be utilized in effecting the desired computation. Briefly, in the preferred embodiment, the method referred to consists in coupling up to the cam 54 and segmental gear 55 a stop arm 60 (Fig. 3) which has a segmental gear 61 meshing with a rack 62 on a reciprocatory link 63 movable in guide-slots in the fixed brackets 39 and 39ª. Thus it will be seen that when the shaft 57 is rocked (counterclockwise as seen in Fig. 3) arm 60 will swing clockwise, until the pin 64 comes up against the stop-plate 65 on the arm 34. thereby shifting the link 63 to the left a distance determined by the position of the arm 34. To permit the shaft 57 and segmental gears 56, 55, to continue their movement after the arm 60 and slide 63 have been arrested, the arm 60 and its segmental gear 61 are connected to the gear 55 through the medium of a spiral spring 66, Figs. 4 and 10, one end of which is attached to the gear 55 and the other to the gear 61.

In addition to the segmental gear 56 the manually actuated shaft 57 also carries a cam 67, Fig. 3, engaging a roller stud 68 on the fork 32ª. The latter being fulcrumed at 69 it will be seen that when the shaft 57 is rocked counterclockwise the cam 67 swings the fork out of engagement with the stud 32ᵇ, on the carrier 32. This releases the said carrier and leaves the scale "free" as described above. A spring 70 urges the fork into engagement with the stud 32ᵇ.

As before stated, the extent of leftward movement of the link 63 depends upon the position of the abutment arm 34, which in turn depends upon the weight of the material in the scale pan. This differential movement of the link is utilized in the computing operation, preferably in the following manner. At its left end, Fig. 3, the said link is pivotally connected to an upright lever 71, fulcrumed at 72 and urged in the counterclockwise direction by a spring 73. To insure release of the pawl 41 and consequent locking of the arm 34 before the link 63 starts to swing the lever 71 the connection between the latter and the link 63 is made by means of the pin and horizontal slot construction shown, thus permitting a slight lost motion of the link before the lever starts to move. As the link begins its movement the pin 74 moves out of the horizontal portion of the slot 75 and then against the ledge edge of the vertical portion, after which the further movement of the link rocks the lever clockwise. The upper arm of the lever 71 has a long slot 76, engaged by a stud 77 on a horizontal slide or bar 78 slidably mounted in a carrier or support 79 which is itself mounted to slide vertically on a pair of guide bars or standards 80. It will therefore be seen that the extent of movement imparted to the slide or bar 78 by the lever 71 depends upon the position of the slide on the guides 80. When the slide is in its uppermost position it will have its maximum movement, and will have its minimum movement when in the lowermost position. On the slide or bar 78 is a rack 81, meshing with a pinion 82 slidable axially on a vertical shaft 83. The latter is square in cross section so as to be rotated by the rack 81 when the bar 78 is reciprocated, and has at its lower end a bevel gear 84 meshing with a bevel gear 85 connected to the disk 86. The result is that the extent of rotation of the disk 86 depends upon two factors: one, the weight of material in the scale pan, through the medium of the arms 34 and 60 and link 63; and the other the position of the slide or bar 78 on the vertical guides 80. The latter factor is, in the present embodiment of the invention, the rate or price per unit of weight, and is varied by adjusting the bar 78 up and down on the said guides. For this purpose the guide 79, in which the said bar moves horizontally, is provided with a vertical rack 87 meshing with a gear 88 fixed to a shaft 89 which also has fixed to it a disk 90 graduated at its edge (see Fig. 1) to indicate the various prices per unit of weight within the range of the machine. A handle or crank 91 (Fig. 5) fixed to the shaft 89 serves to rotate the shaft and thereby revolve the gear 88 and raise or lower the slide 78, at the same time causing the rate per unit weight to be visible to the customer at the front through the window 92 in the casing 11. The handle 91 is provided with an index or pointer 93, traversing a dial 94 graduated with the rates per unit weight, enabling the salesman to adjust the slide 78 with accuracy.

As will be seen from the foregoing explanation, the extent of rotary movement of the disk 86 and the final position thereof depend upon the conjoint effects of two factors,—the weight of material in the scale pan and the rate or price per unit weight. Hence the movement of the disk may be availed of to indicate, both to the salesman and to the customer, the product of said factors. For the first-named purpose a simple and effective method is to provide the shaft 95, which carries the disk 86, with a second disk 96, Figs. 2 and 5, graduated at its edge with the various products. These graduations are visible through a window 97 in the back of the casing 11 and are read against an index 98.

To the customer the products are displayed preferably by means of a series of numeral wheels 100, 101, 102, Figs. 1, 6 and 14, visible through a window 103 in the front of the casing 11. These wheels are mounted on a shaft 104 so as to be rotated independently of each other by means of vertically movable racks 105, 106, 107, meshing with pinions 108, 109, 110, on the respective numeral wheels. The racks are attached to the upper ends of three slides 111, 112, 113, movable vertically on a supporting plate 114, by means of springs 115, 116, 117. Manifestly, a greater or less number of numeral wheels and actuating devices therefor may be provided, according to the number of "columns" to be provided for in the products.

The upward movements of the slides 112, 113, and hence the rotary movements of the numeral wheels 101, 102, are limited by vertically movable slides 118, 119, mounted on the supporting plate 114 and acting through the agency of levers 120, 121, fulcrumed on said plate.

Normally, all three slides 111, 112, 113, are held in their lowermost positions, with the numeral wheels all showing zero through the window 103, by means of a universal bar 122 engaging pins 123, 124, 125, on the slides, (see Figs. 1 and 14). This universal bar is carried by a slide 126 mounted on the plate 114 and is drawn down against the tension of the elevating spring 127 by means of a lever 128 fulcrumed at 129. At its left end (as seen in Fig. 1) the lever has a stud 130 bearing on a cam 131 fixed to the main operating shaft 57 and so designed that as the cam 131 completes its rotary movement, as described above, the drop 132 will come under the stud 130 and permit the lever to rock counterclockwise and the universal bar to rise under the influence of the spring 127, thereby permitting the springs 115, 116, 117, to raise the slides 111, 112, 113, and rotate the numeral wheels 100, 101, 102.

For the purpose of limiting the downward movements of the controlling slides 118, 119, to arrest the numeral wheels with the proper digits in line at the window 103, the disk 86 can be utilized in various ways, preferably the following.

Around the disk 86 are groups of perforations 133, Fig. 15, of ten perforations each, there being as many groups of perforations as there are tens in the maximum product provided for by the machine. The perforations may be located by drawing ten concentric circles on the disk and as many radii as there are units in the maximum product, a perforation being made at each intersection of a radius and a circumference. This makes each group of perforations take the form of a curved line as shown in Fig. 15, with the result that when any perforation in any group is brought into radial alinement with the starting point of the disk, indicated by the dotted line 134 in Fig. 15, no other perforation in that group will be in such alinement. In like manner the disk 86 is provided with a series of circumferentially elongated apertures 135, in number equal to the number of tens in the maximum product and arranged in groups of ten each, the number of groups being equal to the number of hundreds in the maximum product.

Behind the disk 86 at the top thereof is a pin-box 136, Figs. 2, 5, 9 and 13, mounted on the upper end of a lever 137 fixed on a shaft 138. The pin-box has a vertical series of ten pins 139 arranged in register with the position indicated by the line 134 in Fig. 15, and pressed toward the disk 86 by coil springs 140. The spacing of the pins being the same as the radial separation of the perforations 133 in the aforesaid disk, it will be seen that when the pin-box is swung toward the disk by the arm 137 one of the pins, and only one, will find a perforation in its path,—which perforation is determined by the extent of movement of the disk as already explained. Hence that particular pin will pass through the disk and protrude on the other side, the other pins being arrested by the disk itself. Then when the spring 117 (Fig. 14) raises the rack 107 the stop-finger 141 on the controlling slide 119 will strike the protruding pin 139 and arrest the rack 107 and numeral wheel 102 with the proper digit at the window 103, corresponding to the perforation through which the aforesaid pin projects.

The pin-box 136 has a second vertical series of pins, 142, to coöperate with the apertures 135 in the disk 86, so that when the pin-box is swung toward the disk one of the pins 142 will project through the appropriate aperture and into the path of the stop finger 143 (Fig. 14) on the controlling slide 118. Hence when the spring 116 rotates the numeral wheel 101 (through the medium of the slide 112 and rack 106) the numeral wheel will be arrested with the proper digit in line at the window 103.

The pin-box 136 is swung toward the disk, for the purpose explained above, by a cam 144 on the shaft 57, which, it will be remembered, is actuated by the crank or handle 58. On the shaft 138, to which the arm 137 is fixed, is an operating arm 145 coöperating with the cam 144 so that when the same is rocked by the shaft 57 the shaft 138 will be rocked and the pin-box 136 swung over toward the disk 86. It will be understood that the cam 144 is timed to swing the pin-box before the universal bar 122 is released by the cam 131 (Fig. 1).

Instead of providing a third series of apertures in the disk 86, to take care of the numeral wheel 100, we prefer to employ the following means for the purpose.

Fixed to the bevel gear 85, Figs. 5 and 14, is a hundreds or "dollars" cam 146 having three "configurations", in the present instance "drops". On this cam bears the end of a lever 147, connected to the slide 111 which, it will be remembered, is drawn up by the spring 115 to rotate the hundreds or dollars wheel 100. For any product less than one hundred (cents) the cam is in the position shown in Fig. 14 and the slide 111 is held down, with zero appearing on the dollars wheel at the window 103. When, however, the product amounts to one hundred or more but less than two hundred (cents) the cam 146, turning in unison with the disk 86, brings the first drop under the lever, with the result that upon release of the pin 123 by the universal bar 122 the slide 111 is raised, thereby turning the numeral wheel 100 one step and causing the digit "1" to appear at the window. Further movements of the cam bring the second and third drops under the lever and permit the numerals "2" and "3" to be displayed on the dollars wheel.

For the purpose of locking the disk 86 positively in adjusted position it is provided on its periphery with notches 148, one for each perforation 133 and in radial alinement with the notched periphery of the disk is a lever 149, Fig. 3, fulcrumed at 150 and having a stud 151 which is caused to bear on the cam 152 by a spring 153. The cam being fixed to the shaft 57 it will be seen that when the latter is rocked by the handle 58 the cam will be rocked counterclockwise (as seen in Fig. 3), thereby swinging the lever 149 in the same direction and causing its pointed end 154 to move into the notch presented to it. By making the notches 148 and pointed end 154 V-shaped, as shown, the lever can be made to serve as a justifying element, to accurately position the disk 86 as well as to lock it in position. The cam 152 is timed to rock the lever just after the disk 86 is arrested by the arm 60 striking the stop 65 on the arm 34 as previously described.

In operating the machine the salesman may first set the pointer 93 to the rate or price at which the goods are to be sold or he may first deposit the goods in the scale pan. Setting the pointer 93 raises or lowers the slide 78 (Fig. 3) and so alters the distance through which the slide will subsequently be moved by the lever 71. In Fig. 3 we have indicated by dotted lines the positions of the slide 78 at rates or prices ranging up to sixty cents per pound. The goods to be sold having been placed in the scale pan, their weight swings the arm 34 clockwise (as seen in Fig. 3). When the pointers 22, 27, and 40 have come to rest (and with them the arm 34) the operator depresses the handle 58. The first effect of this movement is to release the part 32, so that thereafter the scale pan will be "free" as it was before. At the same time the cam 54 raises the link 50 and releases the pawl 41, which instantly locks the arm 34 to the rack 35. Next the segmental gear 61 moves the link 63 toward the left and thereby shifts the slide 78 toward the right through the medium of the lever 72 until the arm 60 is arrested by the stop 65 on arm 34. This movement of the slide 78 rotates the disk 86 and cam 146 clockwise (as seen in Fig. 3) and brings to the pin-box 136 the proper perforation 133 and aperture 135 in the disk 86 and also adjusts the cam 146. Next the cam 152 swings the lever 149 over into locking engagement with the disk 86, so that the latter and the dollars cam 146 cannot move. The cam 144, Fig. 2, now swings the pin-box 136 against the disk 86, causing one pin from each group 139, 143, to pass through the adjacent opening in the disk, and as soon as this operation is completed the cam 131 (Fig. 1) permits the spring 127 (Fig. 14) to raise the universal bar 122. As the latter rises the springs 115, 116, 117, lift the slides 111, 112, 113, and so rotate the numeral wheels 100, 101, 102, until the slides 118, 119, are arrested by the projecting pins 142, 139, and the lever 147 by the cam 146. The product, that is, the total price of the goods in the pan at the given rate or price per pound, having been noted, the handle 58 is released, whereupon the spring 155, Fig. 3, returns the parts to initial position, aided by such other springs as were under tension during the operations described. The slide 78, however, is left in the position to which it had been set. Obviously it is not necessary to return the slide to the bottom of the guides 80 at the end of each cycle, since the slide can be set to any new position from any position at which it may happen to be.

It will be observed that the leftward movement of the link 63 is always equal to the actual arc traversed by the swinging gear 61, which, it will be remembered moves in unison with the arm 34. Moreover, the pins 74 and 77 engage the lever 71 in the slots 75 and 76. Hence the lower arm of the lever (initially at right angles to the path of the link 63) always forms the hypotenuse of a right-triangle whose base is traversed by the pin 74. Likewise, the upper arm of the lever always forms the hypotenuse of a triangle whose base is traversed by the pin 77. Since in these triangles the angles which meet at the fulcrum of the lever are always equal, one to the other, the triangles are always "similar," and consequently the movement of the slide 78, at any given distance thereof from the fulcrum, is always proportional to the arc through which the gear 61 swings. It will therefore be seen that the machine described comprises: (1) An element which is adjusted in one direction through a distance which is proportional to the value of one of the items of the computation, and is also movable in a direction at an angle to the first; for example the slide 78. (2) An element to actuate or move the first element in the second-named direction; as for example the lever 71. And (3), means, for example the slide 63 and gear 61, for so actuating the second named element as to move the first (at any given position of adjustment thereof) through a space proportional to another item of the computation. The first element controls the product-displaying mechanism, the control in the present case being indirect through the medium of the disk 86.

Hereafter and more particularly in the claims the term "computing multiplying mechanism" will be used. By this is meant a device which "it itself" is adapted to effect the multiplication in contradistinction to devices of that class which merely take off a reading of a computation already made elsewhere and by independent means. The term computing multiplying device will also be understood to distinguish from devices which are in reality a multiplication table and in which the computed result is attained by a selection of a particular number or numbers already present in the multiplication table device. In further explanation it may be stated that a computing multiplying device is adapted to take a setting of one factor and a setting movement corresponding to another factor and carry out by some suitable means a mechanical multiplication of the factors to attain a desired product.

The machine illustrated in Figs. 17, 18, 19, 20 and 21 is a simpler form of the invention, made simpler by omitting the arm 34 and the parts which actuate it, and by the omission of certain other parts. In Fig. 17 the arm 60 of Fig. 3 takes the form shown at 160 and is provided with a knob 161 projecting through an arc-shaped slot 162 in the casing 11. When the pointers 22, 27, actuated by the scale beam 14, have come to rest, the operator swings the arm 160 by means of the knob 161 till the pointers 163, carried by the arm 160, coincide with the pointers 22, 27. The arm 160 is loose on the shaft 164 but is rigidly connected with a segmental gear 165 meshing with a double segmental gear 166 which also meshes with the rack 167 on the end of link 168, corresponding to the link 63 in Fig. 3. The described movement of the arm 160 therefore rocks the lever 169. The latter, slide 170 actuated by it, and the parts actuated by the slide, are in all respects the same as those described in connection with Figs. 1 to 16 inclusive, and hence need no further description here. When the pointers 163 have been brought into coincidence with pointers 22, 27, the operator swings the handle 171. The first effect of this operation is to rock the pin-box 172 through the agency of cam 173, arm 174, and shaft 175. The cam 176 then rocks the lever 177, which raises the slide 178 carrying the universal bar 179. This releases the numeral-wheel-actuating slides 180, 181, 182, whereupon the numeral wheels 183, 184, 185, are set exactly as described in connection with the similar parts in Figs. 1 to 16.

A still simpler form of the invention, unconnected with a scale for weighing goods, is shown in Figs. 22, 23, 24, and 25.

In this form, as in the others described herein, one of the factors is "set up" by adjusting the slide 190 vertically by means of the handle 190ª, thus varying the extent of movement of the slide by the lever 191. The other factor is taken account of by setting the pointer 192, which rocks the lever 191, through the medium of the segmental gears 193, 194, and rack-link 195, and rotates the apertured disk 196 and hundreds-cam 196ª as the slide 190 is shifted by the aforesaid lever. These operations having been performed, the operator depresses the handle 197. This first rocks the cam 198 and swings the pin-box 199 against the disk 196, after which the cam 200, fixed on the shaft 201 raises the universal bar 202, releasing the slides 203, 204, 205, and permitting the said slides to rise and set the numeral wheels 206, 207, 208. This form of the invention finds utility in various fields, as for example in cost-keeping, where it is desired to multiply numbers representing time by numbers representing labor-cost per unit of time.

As previously intimated, the invention is by no means limited to the machines specifically illustrated and described herein, but may be embodied in a variety of other forms without departing from its proper spirit and scope.

What we claim is:

1. In a computing scale, the combination of an adjustable controlling element; means adjustable in accordance with the product of the weight on the scale and another factor to determine the adjustment of the controlling element; motive power means independent of the motive power of the scale for operating the aforesaid means; numeral wheels; means to rotate the numeral wheels; and means under the control of said controlling element to arrest the numeral wheels.

2. In a computing scale, in combination with a movable element; and means for moving the same through a space proportional to the product of two factors, said means comprising an actuating member movable in one direction to actuate the said element and adjustable in a direction at an angle to the first, a device movable through a space proportional to the value of one of said factors and connected with said member to actuate the same, motive power means for operating the said device independently of the motive power of the scale but controlled in its extent of movement thereby, said motive power means being adapted to thereafter restore the device to normal position, and means for adjusting the actuating member to an extent proportional to the value of the other factor to vary the extent of movement imparted to said member by the aforesaid device.

3. In a computing scale, the combination of a member movable in one direction, and capable of adjustment in a direction at an angle to the first in accordance with the value of an item of the computation; a movable actuating element connected with said member to move the same in the first named direction to a position determined conjointly by the adjustment of said member and the extent of movement of the actuating element itself, and means controlled by the scale but operable by a source of motive power independent of the motive power of the scale for moving the actuating element through a space proportional to the weight on the scale constituting the value of another item of the computation.

4. In a computing scale, the combination of a member movable in one direction, and adjustable in another direction at an angle to the first; means, including a graduated scale, for adjusting the member in accordance with the value of one item of the computation; a lever to which the member is adjustably connected for movement thereby in the first-named direction; motive power means independent of the motive power of the scale; means for rocking the lever in accordance with the weight on scale constituting the value of another item of the computation; whereby the extent of movement of said member is determined by said items conjointly; and means controlled by said member for displaying the result of the computation.

5. In a computing scale, the combination with a scale-moved part, a member bodily movable in one direction in direct accordance with the weight on the scale and adjustable in a direction at an angle to the first in accordance with the price per pound of the commodity weighed, motive power means independent of the scale and including a resilient lost motion operating connection for operating said member in accordance with the extent of movement of the scale-moved part, and a controlling device from which readings of computed costs may be taken, said controlling device being adapted to be moved by said member to an extent determined jointly by the extent of adjustment of said member and the movement imparted thereto by the aforesaid means.

6. In a computing scale, the combination of a weighing scale, an actuating lever; a slide connected therewith for actuation and adjustable relatively to the fulcrum of the lever; means for rocking the lever through various angles to correspond with the weight on the scale; a rotary disk connected with the slide for rotation thereby, and having digit-perforations located according to the values of the digits; and means controlled by said perforations to display the results of the computations.

7. In a computing scale, the combination of a weighing scale, a movable controlling element having digit-openings located in accordance with the values of the digits; means for moving the controlling element through a space substantially proportional to the product of two factors, one of said factors being proportional to the weight on the scale; a pin-box movable toward and from the controlling element and having a plurality of digit-pins each adapted to project through an appropriate perforation when the same is presented in the path of the pin; and product-displaying means controlled by the projecting pin or pins.

8. In a computing scale, the combination of a weighing scale, a rotary disk having radially and angularly spaced groups of radially and angularly spaced perforations corresponding to digits of different notational orders; means for rotating the disk through an angle substantially proportional to the product of the weight on the scale and another factor; a pin-box movable toward and from the disk and having spaced groups of spaced pins arranged to permit a single pin of each group to project through an appropriate perforation in the disk when the pin-box is moved toward the latter; and product-displaying means controlled by the projecting pin or pins.

9. In a computing scale, the combination of a weighing scale, a movable controlling element having spaced digit-perforations arranged in spaced groups; means for moving said element through a space substantially proportional to the product of factors at least one of which is variable in accordance with the weight upon the scale; and product-displaying mechanism coöperating with said element for control of the perforations therein.

10. In a computing scale, a rotary disk having radially and angularly spaced groups of radially and angularly spaced digit-perforations; weighing scale means and manually operated price per pound setting means; means for turning the disk through an angle corresponding to the product of factors, one factor being proportional to price and the other proportional to the weight on the scale; and product-displaying mechanism controlled by the disk through the agency of the said perforations.

11. In a computing scale, the combination of a weighing scale, rotary numeral-wheels for displaying the product of two factors; one of said factors being proportional to the weight upon the scale; means for rotating said wheels; means for controlling the rotation of the numeral wheels, including sliding members connected with and movable in correspondence with the respective wheels, a controlling element movable past the sliding members and having spaced groups of digit-perforations, and parts coöperating with the sliding members through perforations in the controlling element to arrest the sliding members; and means associated with the scale for moving the controlling element past the sliding members proportionally to the product of factors at least one of which is variable.

12. In a computing scale, the combination of a weighing scale, product-displaying wheels; sliding members connected with the wheels; mechanism, including a movable controlling element having spaced groups of digit perforations and parts adapted to coöperate with said sliding members through perforations in said element to determine the rotary movements of said numeral wheels; and means for moving the controlling element proportionately to the product of factors at least one of which is variable in accordance with the varying weight on the scale.

13. In a computing scale, the combination of a weighing scale; numeral wheels; means for rotating the wheels; controlling slides connected with the wheels; a disk rotatable past the controlling slides and having spaced groups of digit-perforations; parts movable through perforations in the disk and into the paths of the controlling slides to arrest the same and thereby arrest the wheels; and scale controlled means for rotating the disk past the controlling slides proportionately to the product of factors at least one of which is variable.

14. In a computing scale, the combination of a weighing scale, a rotary disk having spaced groups of digit-perforations; a pin-box movable toward and from the face of the disk and provided with pins adapted to project through the perforations; means for turning the disk past the pin-box proportionately to the product of factors at least one of which is variable in accordance with the weight on the scale; numeral wheels for displaying such product; means for rotating the wheels in one direction; controlling slides movable with the wheels in paths crossing the paths of the pins through the disk, whereby to meet and be arrested by projecting pins; and means for restoring the wheels and slides to initial position.

15. In a computing scale, the combination of a weighing scale, a horizontally movable slide, a vertically adjustable support therefor, a vertical lever to which the slide is adjustably connected, an actuating member connected with the lever and controlled in its extent of movement by the weighing scale, a rotary disk having digit-perforations, means connecting the slide and the disk to rotate the latter, and product-displaying means controlled by said disk through the agency of the digit-perforations.

16. In a computing scale, the combination of a weighing scale, a vertical lever, a vertically adjustable carrier or support, a bar mounted in the carrier to slide horizontally therein and slidably connected with the lever for actuation thereby, a link slidably connected with the lever to rock the same, a rotary disk having digit-perforations and connected with the slide for rotation thereby, product-displaying mechanism controlled by the disk through the agency of said perforations, means to adjust the carrier and slide toward and from the fulcrum of the lever in accordance with the value of a factor to be multiplied, and means to actuate the link in accordance with the value of another factor proportional to the weight on the scale.

17. In a computing scale, the combination of a weighing scale, a movable controlling member having digit-perforations for a lower notational order; a cam having digit-configurations for a higher notational order; means for moving said disk and cam through a space corresponding to the product of the weight upon the scale and another factor proportional to the price per pound; and product-displaying mechanism controlled by said disk and cam through the agency of the perforations and configurations thereof.

18. In a computing scale, the combination of a weighing scale, a rotary disk having digit-perforations for a lower notational order; a rotary cam having digit-configurations for a higher notational order; means for turning the disk and cam through an angle corresponding to the weight upon the scale and the price per pound of the commodity weighed; and product-displaying means controlled by the disk and cam through the agency of the perforations and configurations thereof.

19. In a computing scale, the combination of a movable controlling element having digit-perforations; product-displaying mechanism controlled by said element through the agency of the perforations therein; means for moving the controlling member through a space corresponding to the product of factors at least one of which is variable, said means including an adjustable stop-member to determine the movement of said element, and weight-actuated mechanism releasably connected with the stop-member to adjust the same; means for locking the stop-member in adjusted position; and means for releasing the stop-member from the weight-actuated mechanism.

20. In a computing scale, the combination of a movable controlling element in the form of a rotary disk having digit-perforations; product-displaying devices controlled by said disk through the agency of the perforations therein; means for turning the disk through an angle corresponding to the product of factors at least one of which is variable; said means including an adjustable stop-member to determine the movement of the disk, and weight-actuated mechanism releasably connected with the stop member to adjust the same; and means for simultaneously releasing the weight-actuated mechanism from the stop-member and locking the latter in adjusted position.

21. In a computing scale, the combination of a movable controlling element; product-displaying mechanism controlled by said element; an adjustable stop-member to limit the movement of the controlling element; weight-actuated mechanism releasably connected with the stop-member to adjust the same; and means for locking the stop-member in adjusted position and releasing the weight-actuated mechanism therefrom.

22. In a computing scale, the combination of a weighing scale, an element movable through a space corresponding to the product of factors corresponding to the weight on the scale and the price per pound of the commodity weighed; an adjustable stop-member to limit the movement of said element; weight actuated mechanism to adjust the stop-member, including a weight-actuated member, a bevel-gear connected with the weight-actuated member for actuation thereby, an oppositely disposed bevel gear co-axial with the first and connected with the stop-member to move the latter, a bevel pinion in mesh with both gears and revoluble bodily about the axis of said gears and rotatable about an axis radial to the first-named axis, and means for holding the pinion against revolution about the axis of the bevel gears; mechanism to lock the stop member in adjusted position; and means to release the said pinion and permit the same to revolve about the axis of said gears whereby the weight-actuated member is permitted to move freely after the stop-member is locked.

23. In a computing scale, the combination of an element movable through a space corresponding to the product of factors at least one of which is variable; an adjustable stop-member to limit the movement of said element; a bevel gear connected with the stop-member to adjust the same; an oppositely disposed bevel gear co-axial with the first; a weight-actuated member connected with the last-named bevel gear to actuate the same; a bevel pinion meshing with both gears, rotatable about an axis radial to the axis of the gears and also revoluble about the axis of said gears, said pinion being normally locked against such revolution; mechanism for locking the stop-member in adjusted position; mechanism to unlock the bevel pinion; mechanism to move the aforesaid element to the limit of its movement as determined by the stop-member; and manual actuating means common to all said mechanisms.

24. In a computing scale, the combination of an element movable through a space corresponding to the product of factors at least one of which is variable; an adjustable stop-member to limit the movement of said element; a weight-actuated member releasably connected with the stop-member to adjust the same; and means for simultaneously locking the stop-member and releasing the weight-actuated member from connection therewith.

25. In a computing scale, the combination of an element movable through a space corresponding to the product of factors at least one of which is variable; a swinging stop-arm to limit the movement of said element; a rack concentric with the path of said arm; a pawl carried by the arm to engage the rack but normally disengaged therefrom; a weight-actuated member releasably connected with the arm to swing the same; and means for causing the pawl to engage the rack and disconnecting the arm and the weight-actuated member, whereby the arm is locked and the weight-actuated member is left free.

26. In a computing scale, the combination of an element movable through a space corresponding to the product of factors at least one of which is variable; a swinging stop-arm to limit the movement of the said element; a swinging arresting arm connected with the said movable element and arranged to coöperate with the stop-arm to arrest said element; a weight-actuated member releasably connected with the stop-arm to swing the same; means to lock the stoparm in any position to which it may be swung by the weight-actuated member; and means to disconnect the stop-arm and the said member.

27. In a computing scale, the combination of an element movable through a space corresponding to the product of factors at least one of which is variable; a swinging stop-arm to limit the movement of said element; a rack concentric with the path of the stop-arm; a pawl carried by the stop-arm to engage the rack but normally disengaged therefrom; a bevel gear connected with the stop-arm to swing the same; an oppositely disposed bevel gear co-axial with the first; a weight-actuated member connected with the last-named gear to rotate the same; a bevel pinion meshing with both gears and revoluble about the axis thereof and also rotatable about its own axis radial to the first-named axis, said pinion being normally locked against revolving; mechanism to cause said pawl to engage the rack and thereby lock the stop-arm; mechanism to unlock the bevel pinion and thereby permit the same to revolve about the axis of the bevel gears; and manual actuating means common to said mechanisms.

28. In a computing scale, the combination of an element movable through a space corresponding to the product of factors at least one of which is variable; mechanism for moving said element, including a swinging arm to arrest the element; a stop-arm arranged to swing in the path of the arresting arm; a rack concentric with the path of the stop-arm; a pawl carried by the stop-arm to engage the rack but normally disengaged therefrom; a weight-actuated member; a differential device comprising a pair of co-axial bevel gears one connected with the stop-arm to swing the same and the other connected with the weight-actuated member for rotation thereby, and a bevel pinion meshing with both gears and revoluble about the axis of the gears, said pinion being normally locked against revolution; mechanism to cause said pawl to engage the rack; mechanism to unlock the pinion of the aforesaid differential device; and manual actuating means common to all the aforesaid mechanisms.

29. In a computing scale, the combination of a disk having digit-perforations and rotatable through an angle corresponding to the product of factors at least one of which is variable; numeral-wheels for displaying such product; mechanism coöperating with the perforations in said disk to control the operation of the numeral-wheels; an adjustable stop-member to limit the rotation of the perforated disk; a weight-actuated member releasably connected with the stop-member to adjust the same; mechanism to lock the stop member in adjusted position; mechanism to disconect the stop-member and the weight-actuated member; and manual actuating means common to all the aforesaid mechanisms.

30. In a computing scale, the combination of a rotary disk having digit-perforations and rotatable through an angle corresponding to the product of factors at least one of which is variable; numeral wheels for displaying such product; mechanism to control the operation of the numeral wheels, including a pin-box movable toward the disk and carrying a plurality of pins movable independently of each other in the pin-box to coöperate singly with the perforations in the disk; an adjustable stop-member to limit the rotation of the disk; a weight-actuated member releasably connected with the stop-member to adjust the same; and manually actuated means to lock the stop-member in adjusted position, disconnect the stop-member and the weight-actuated member, rotate the perforated disk, and move the pin-box toward the disk.

31. In a computing scale, the combination of a rotary controlling disk having units-perforations arranged in angularly spaced groups of ten perforations each and tens-perforations arranged in angularly spaced groups of ten perforations each; a pin-box movable toward the disk and having units and tens groups of independently movable pins arranged to permit a single pin of each group thereof to project through the appropriate perforation in the corresponding group on the disk according to the angle through which the disk is turned past the pin box; product-displaying numeral-wheels controlled by the projecting pins; an adjustable stop-member to limit the turning movement of the disk; a weight-actuated member releasably connected with the stop-member to adjust the same; mechanism for locking the stop-member in adjusted position; mechanism for disconnecting the stop-member and the weight-actuated member; mechanism for turning the disk past the pin-box; mechanism for moving the pin-box toward the disk; and manual operating means common to all said mechanisms.

32. In a computing scale, in combination with a weighing scale adapted to take varying positions in accordance with varying loads thereon, a computing multiplying device adapted of itself to multiply price per pound and weight and obtain computed cost, means for setting the said computing multiplying device in accordance with price per pound, a stop positioned to the scale, manually operated means constituting a source of energy independent of the energy of the scale for actuating the computing multiplying device to an extent determined by the scale positioned stop to carry out the multiplication, means for locking the said stop during the computing operation, and means for taking a reading of computed cost from the said multiplying device.

33. In a computing scale, the combination with a weighing scale having varying displacements with varying loads, and an adjustable controlling element, and means for moving the same through a space proportional to the product of the two factors, one of weight and the other of price per pound, said means comprising an adjustable computing device adapted to be moved in one direction to actuate said element in accordance with the weight factor and adapted to be adjusted in a direction at an angle to the first in accordance with the price per pound factor, scale positioned means for controlling said first mentioned movement in direct proportion to the displacement of the scale, and motive power means independent of the motive power of the scale to move said computing device to the position predetermined by the displacement of the scale to carry out the multiplication and afterward move said computing device to normal position.

34. In a computing scale, the combination with a weighing scale having varying displacements with varying loads, and an adjustable controlling element, and means for moving the same through a space proportional to the product of the two factors, one of weight and the other of price per pound, said means comprising an adjustable computing device adapted to be moved in one direction to actuate said element in accordance with the weight factor and adapted to be adjusted in a direction at an angle to the first in accordance with the price per pound factor, scale positioned means for controlling said first mentioned movement in direct proportion to the displacement of the scale, manually operated power means independent of the motive power of the scale to move said computing device to the position predetermined by the displacement of the scale to carry out the computation, and means for locking the scale positioned means during the computing operation.

35. In a computing scale, the combination with a weighing scale having varying displacements with varying loads, and an adjustable controlling element, and means for moving the same through a space proportional to the product of the two factors, one of weight and the other of price per pound, said means comprising an adjustable computing device adapted to be moved in one direction to actuate said element in accordance with the weight factor and adapted to be adjusted in a direction at an angle to the first in accordance with the price per pound factor, scale positioned means for controlling said first mentioned movement in direct proportion to the displacement of the scale, motive power means independent of the motive power of the scale to move said computing device to the position predetermined by the displacement of the scale to carry out the computation and for thereafter restoring the computing device to normal position, and means for taking reading of the computed cost from the controlling element upon the completion of the computing operation.

36. In a computing scale, the combination with an adjustable controlling element, and means for moving the same through a space proportional to the product of two factors, one of weight the other of price, said means comprising a computing actuating device for said element, said device being adapted to be moved in one direction through a space proportional to a factor of weight and to be adjusted in a direction at an angle to the first in accordance with the price factor, means for controlling said first mentioned movement in accordance with varying scale positions, means independent of the scale for effecting the aforesaid movement of the computing actuating device, numeral wheels for indicating computed cost, means for turning said wheels, and means for arresting the movement of said wheels in accordance with the position of the controlling element.

37. In a computing scale, the combination of an adjustable controlling element; means adjustable in accordance with the product of the weight on the scale and another factor to determine the adjustment of the controlling element; a plurality of numeral wheels for digits and higher orders; means to rotate said digit numeral wheels; means under the control of said controlling element to arrest the digit numeral wheels; and means independent of the aforesaid means for controlling the turning of the higher order numeral wheels.

38. In a computing scale, the combination of an adjustable controlling element; means adjustable in accordance with the product of the weight on the scale and another factor to determine the adjustment of the controlling element; means associated with the aforesaid means for adjusting the same to an extent controlled by the weight on the scale by a source of energy independent of the scale; a plurality of numeral wheels; means to rotate said numeral wheels; and means under the control of said controlling element to arrest the said numeral wheels to thereby display the computed cost of the article weighed.

In testimony whereof we affix our signatures in the presence of two subscribing witnesses.

HARRY T. GOSS.
JAMES W. BRYCE.

Witnesses:
M. LAWSON DYER,
S. S. DUNHAM.